US008670300B2

(12) United States Patent
Cho et al.

(10) Patent No.: US 8,670,300 B2
(45) Date of Patent: Mar. 11, 2014

(54) NETWORK DEVICE RELATING TO DIGITAL SUBSCRIBER LINE

(75) Inventors: Yu-Sung Cho, Hsinchu (TW); Yung-Chang Lin, New Taipei (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 392 days.

(21) Appl. No.: 13/106,885

(22) Filed: May 13, 2011

(65) Prior Publication Data

US 2012/0287976 A1 Nov. 15, 2012

(51) Int. Cl.
*G01R 31/08* (2006.01)
*H04B 17/00* (2006.01)

(52) U.S. Cl.
USPC ......... 370/216; 370/242; 398/17; 379/395.01

(58) Field of Classification Search
USPC ......... 370/216, 242–245, 419, 463; 379/1.03, 379/395.01, 413; 398/17, 58, 10, 15; 375/222
See application file for complete search history.

(56) References Cited

U.S. PATENT DOCUMENTS

| 5,523,868 | A | * | 6/1996 | Hawley | 398/38 |
| 7,573,941 | B2 | | 8/2009 | Yang | |
| 7,940,118 | B1 | * | 5/2011 | Forghani-zadeh et al. | 327/536 |
| 2003/0035377 | A1 | * | 2/2003 | Ju | 370/245 |
| 2006/0290207 | A1 | * | 12/2006 | Swanson et al. | 307/66 |
| 2008/0046768 | A1 | * | 2/2008 | Chuang | 713/300 |
| 2009/0217062 | A1 | * | 8/2009 | Diab | 713/310 |
| 2011/0109374 | A1 | * | 5/2011 | Forghani-zadeh et al. | 327/535 |
| 2013/0089318 | A1 | * | 4/2013 | Mahony et al. | 398/2 |

FOREIGN PATENT DOCUMENTS

| TW | I271993 | 1/2007 |
| TW | 201027879 | 7/2010 |

\* cited by examiner

*Primary Examiner* — Kerri Rose
(74) *Attorney, Agent, or Firm* — Jianq Chyun IP Office

(57) ABSTRACT

A network device relating to a digital subscriber line (DSL) such as an asymmetrical DSL (ADSL) or a very high bit rate DSL (VDSL) is provided. In the present invention, the capacitors equipped into the network device are separated and grouped into two independent groups. When the network device runs out of power, the energy of one of the two independent groups is provided for generating the dying gasp signal, and the energy of the other of the two independent groups is provided for amplifying and transmitting the dying gasp signal to a Central Office (CO). Accordingly, the CO can be accurately known whether the network device runs out of power or not, and the respective capacitances of the two independent groups can be significantly reduced so as to reduce the cost of the network device.

18 Claims, 1 Drawing Sheet

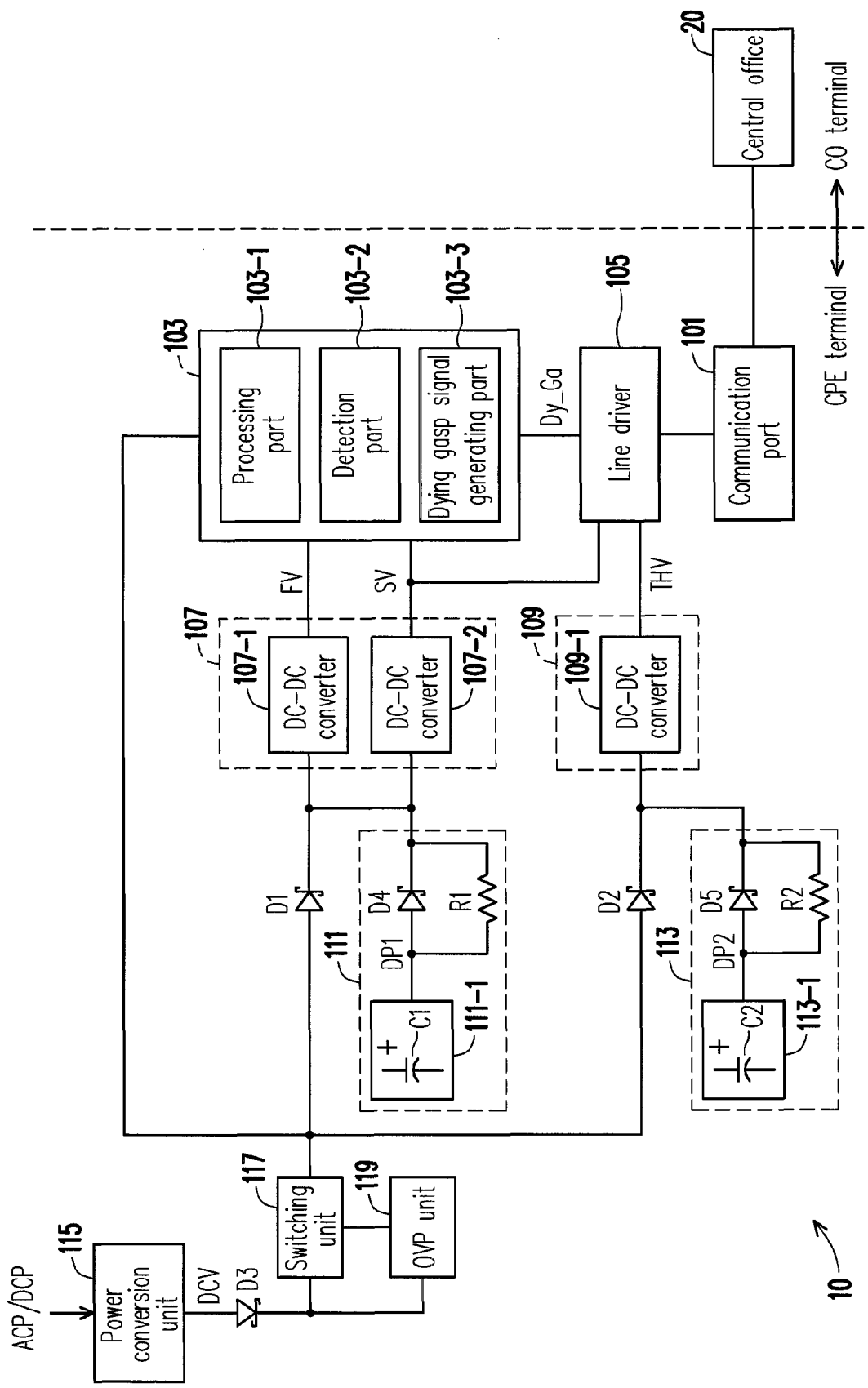

NETWORK DEVICE RELATING TO DIGITAL SUBSCRIBER LINE

BACKGROUND OF THE INVENTION

1. Field of the Invention

The present invention relates to a network device, more particularly, to a network device relating to a digital subscriber line (DSL) such as an asymmetrical DSL (ADSL) or a very high bit rate DSL (VDSL).

2. Description of the Related Art

The growing requirements for internet information have increased the popularity of broadband access services. Digital Subscriber Line (DSL) technology has become a main broadband access technology in the word due to its convenient deployment, good performance, and lower cost.

Asymmetrical Digital Subscriber Line (ADSL) and Very high bit rate Digital Subscriber Line (VDSL) are the most popular kind of DSL technologies. In a typical application, a Customer's Premises Equipment (CPE) is usually configured, controlled, maintained and upgraded by a Central Office (CO). The International Telecommunications Union (ITU) standard G992.1 relating to xDSL prescribes that when an ADSL CPE or a VDSL CPE runs out of power, the ADSL CPE or the VDSL CPE must generate a dying gasp signal, and send the generated dying gasp signal to an ADSL CO or a VDSL CO.

Unfortunately, if the ADSL CPE or the VDSL CPE is completely without power, it cannot operate and send the dying gasp signal to the ADSL CO or the VDSL CO. Accordingly, in the conventional, energy-storage elements, for example capacitors, are taken and equipped into the ADSL CPE or the VDSL CPE, such that when the ADSL CPE or the VDSL CPE runs out of power, the ADSL CPE or the VDSL CPE still can generate the dying gasp signal to the ADSL CO or the VDSL CO in response to the storage of the equipped capacitors.

However, the energies of the equipped capacitors are simultaneously consumed by all of DC-DC converters for generating a plurality of DC operation voltages required by the ADSL CPE or the VDSL CPE when the ADSL CPE or the VDSL CPE runs out of power. In this case, the ADSL CPE or the VDSL CPE may not send the dying gasp signal to the ADSL CO or the VDSL CO. In order to solve such problem, the capacitances of the equipped capacitors are needed to be increased. Nevertheless, the cost of the ADSL CPE or the VDSL CPE is increased by such solution; moreover, the equipped capacitors with high capacitances take up more space on a printed board circuit (PCB) and thus make the layout of the PCB problematic.

SUMMARY OF THE INVENTION

The present invention is directed to a network device so as to solve all of problems mentioned in the "Related Art".

The present invention provides a network device and which includes a communication port; a system-on-a-chip (SoC) operated under a first DC operation voltage and a second DC operation voltage, wherein the SoC is used for generating a dying gasp signal when the network device runs out of power; a line driver coupled between the communication port and the SoC and operated under the second DC operation voltage and a third DC operation voltage, wherein the line driver is used for receiving and amplifying the dying gasp signal from the SoC, and transmitting the amplified dying gasp signal to a central office (CO); a first conversion unit coupled to the SoC and the line driver, for receiving and converting a DC input voltage, so as to generate the first DC operation voltage and the second DC operation voltage; a second conversion unit coupled to the line driver, for receiving and converting the DC input voltage, so as to generate the third DC operation voltage; a first energy-storage unit coupled to the first conversion unit, for providing a first DC power relating to the DC input voltage to the first conversion when the network device runs out of power; and a second energy-storage unit coupled to the second conversion unit, for providing a second DC power relating to the DC input voltage to the second conversion when the network runs out of power.

The present invention also provides a network device, and which includes a system-on-a-chip (Soc); a line driver, coupled to the SoC; and at least two independent energy-storage elements, wherein when the network device runs out of power, the SoC generates a dying gasp signal to the line driver in response to energy of one of the energy-storage elements, and then the line driver amplifies and transmits the dying gasp signal to a Central Office (CO) in response to energy of the other of the energy-storage elements.

It is to be understood that both the foregoing general description and the following detailed description are exemplary, and are intended to provide further explanation of the invention as claimed.

BRIEF DESCRIPTION OF THE DRAWINGS

The accompanying drawing is included to provide a further understanding of the invention, and is incorporated in and constitute a part of this specification. The drawing illustrates embodiments of the invention and, together with the description, serves to explain the principles of the invention.

FIG. 1 is system block diagram of a network device according to an embodiment of the present invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

FIG. 1 is system block diagram of a network device 10 according to an embodiment of the present invention. Referring to FIG. 1, the network device 10 may be a customer's premises equipment (CPE) relating to a digital subscriber line (DSL) such as an asymmetrical DSL (ADSL) or a very high bit rate DSL (VDSL). And, the network device 10 may include a communication port 101, a system-on-a-chip (SoC) 103, a line driver 105, a first conversion unit 107, a second conversion 109, a first energy-storage unit 111, a second energy-storage unit 113, a power conversion unit 115, a switching unit 117, an over-voltage-protection (OVP) unit 119, and diodes D1-D3. Of course, in the other embodiment of the present invention, the switching unit 117, the OVP unit 119 and the diode D3 are not essential components, all of which are additional components based on the real application.

In the present embodiment, the SoC 103 is operated under a first DC operation voltage FV (for example, 3.3V, but not limited thereto) and a second DC operation voltage SV (for example, 2.5V, but not limited thereto). The SoC 103 is used for generating a dying gasp signal Dy_Ga when the network device 10 runs out of power. To be specific, the SoC 103 may include a processing part 103-1, a detection part 103-2 and a dying gasp signal generating part 103-3. The processing part 103-1 is used to be served as core of operation of the network device 10. The detection part 103-2 is used for detecting whether the network device 10 runs out of power or not. The dying gasp signal generating part 103-3 is used for generating the dying gasp signal Dy_Ga when the network device 10 runs out of power.

The line driver 105 is coupled between the communication port 101 and the SoC 103, and is operated under the second DC operation voltage SV and a third DC operation voltage THV (for example, 7V, but not limited thereto). The line driver 105 is used for receiving and amplifying the dying gasp signal Dy_Ga from the SoC 103, and then transmitting the amplified dying gasp signal Dy_Ga to a Central Office (CO) 20. Of course, in the other embodiment of the present invention, the liner driver 105 can be only operated under the single third DC operation voltage THV. In other words, based on the real application, the line driver 105 can be designed to operate under a single DC operation voltage or two different DC operation voltages.

The first conversion unit 107 is coupled to the SoC 103 and the line driver 105, and is used for receiving and converting a DC input voltage DCV, so as to generate the first DC operation voltage FV and the second DC operation voltage SV. To be specific, the first conversion unit 107 may include two DC-DC converters 107-1 and 107-2. The DC-DC converters 107-1 is used for receiving and converting the DC input voltage DCV, so as to generate the first DC operation voltage FV. The DC-DC converters 107-2 is used for receiving and converting the DC input voltage DCV, so as to generate the second DC operation voltage SV.

The second conversion unit 109 is coupled to the line driver 105, and is used for receiving and converting the DC input voltage DCV, so as to generate the third DC operation voltage THV. To be specific, the second conversion unit 109 may include a DC-DC converter 109-1. The DC-DC converter 109-1 is used for receiving and converting the DC input voltage DCV, so as to generate the third DC operation voltage THV. Of course, in the other embodiment of the present invention, each of the DC-DC converters 107-1, 107-2 and 109-1 can be replaced by LDO (low dropout) converter, or other converter capable of generating DC operation voltage.

The first energy-storage unit 111 is coupled to the first conversion unit 107, and is used for providing a first DC power DP1 relating to the DC input voltage DCV to the first conversion unit 107 when the network device 10 runs out of power. To be specific, the first energy-storage unit 111 may include an energy-storage element 111-1, a diode D4 and a resistor R1. The energy-storage element 111-1 is used for providing the first DC power DP1 to the first conversion unit 107 when the network device 10 runs out of power, otherwise (i.e. the network device 10 does not run out of power), the energy-storage element 111-1 is charged in response to the DC input voltage DCV. An anode of the diode D4 is coupled to the energy-storage element 111-1, and a cathode of the diode D4 is coupled to the first conversion unit 107. The resistor R1 is coupled with the diode D4 in parallel. In the present embodiment, the energy-storage element 111-1 may be composed of a single capacitor C1, but also be composed of a plurality of capacitors C1 connected in parallel. Moreover, in the other embodiment of the present invention, the diode D4 can be an additional component due to the inactivation of inrush current, such that the resistance of the resistor R1 can be set to 0-ohm. In other words, the resistor R1 with a certain resistance and the diode D4 are required due to the activation of inrush current.

The second energy-storage unit 113 is coupled to the second conversion unit 109, and is used for providing a second DC power DP2 relating to the DC input voltage DCV to the second conversion unit 109 when the network device 10 runs out of power. To be specific, the second energy-storage unit 113 may include an energy-storage element 113-1, a diode D5 and a resistor R2. The energy-storage element 113-1 is used for providing the second DC power DP2 to the second conversion unit 109 when the network device 10 runs out of power, otherwise (i.e. the network device 10 does not run out of power), the energy-storage element 113-1 is charged in response to the DC input voltage DCV. An anode of the diode D5 is coupled to the energy-storage element 113-1, and a cathode of the diode D5 is coupled to the second conversion unit 109. The resistor R2 is coupled with the diode D5 in parallel. In the present embodiment, the energy-storage element 113-1 may be composed of a single capacitor C2, but also be composed of a plurality of capacitors C2 connected in parallel. Similarly, in the other embodiment of the present invention, the diode D5 can be an additional component due to the inactivation of inrush current, such that the resistance of the resistor R2 can be set to O-ohm. In other words, the resistor R2 with a certain resistance and the diode D5 are required due to the activation of inrush current.

An anode of the diode D1 is used for receiving the DC input voltage DCV, and a cathode of the diode D1 is coupled to the first conversion unit 107. An anode of the diode D2 is used for receiving the DC input voltage DCV, and a cathode of the diode D2 is coupled to the second conversion unit 109. The power conversion unit 115 is used for receiving and converting an AC power ACP or a DC power DCP, so as to provide the DC input voltage DCV. Obviously, the power conversion unit 115 could be an AC-DC power converter or a DC-DC power converter.

An anode of the diode D3 is used for receiving the DC input voltage DCV provided by the power conversion unit 115. The switching unit 117 is coupled to a cathode of the diode D3, and is used for transmitting the DC input voltage DCV to the anodes of the diodes D1 and D2 until the network device 10 runs out of power. The OVP unit 119 is coupled to the cathode of diode D3 and the switching unit 117, and is used for controlling the switching unit 117 to stop transmitting the DC input voltage DCV when the DC input voltage DCV provided by the power conversion unit 115 is over-voltage.

From the above, when the power conversion unit 115 is capable of normally providing the DC input voltage DCV, and the provided DC input voltage DCV is not over-voltage, the switching unit 117 would be activated to transmit the DC input voltage DCV provided by the power conversion unit 115 to the first and the second conversion units 107 and 109. Accordingly, the DC-DC converter 107-1 and 107-2 would respectively generate the first DC operation voltage FV and the second DC operation voltage SV in response to the DC input voltage DCV. Also, the DC-DC converter 109-1 would generate the third DC operation voltage THV in response to the DC input voltage DCV.

In the other hands, the energy-storage element 111-1 would be charged in response to the DC input voltage DCV provided by the power conversion unit 115 through the resistor R1. Similarly, the energy-storage element 113-1 would be charged in response to the DC input voltage DCV provided by the power conversion unit 115 through the resistor R2. Meanwhile, since the SoC 103 can be known that, through the detection of the detection part 103-2, the network device 10 does not run out of power. Therefore, the dying gasp signal generating part 103-3 of the SoC 103 would not generate the dying gasp signal Dy_Ga.

Once the network device 10 runs out of power (i.e. the power conversion unit 115 is incapable of normally providing the DC input voltage DCV), the switching unit 117 would be immediately inactivated, such that the detection part 103-2 can immediately detect that the network device 10 runs out of power. Meanwhile, the energy-storage element 111-1 would provide the first DC power DP1 to the first conversion unit 107 through the diode D4, and at this time, the first DC power DP1 would not be returned back to other loops in response to the block of the diode D1, so as to prevent the power loss. Also, the energy-storage element 113-1 would provide the second DC power DP2 to the second conversion unit 109 through the diode D5, and at this time, the second DC power DP2 would not be returned back to other loops in response to the block of the diode D2, so as to prevent the power loss. Accordingly, the DC-DC converter 107-1 and 107-2 would respectively generate the first DC operation voltage FV and the second DC operation voltage SV in response to the first DC power DP1. Also, the DC-DC converter 109-1 would generate the third DC operation voltage THV in response to the second DC power DP2.

Furthermore, the SoC 103 can be known that, through the detection of the detection part 103-2, the network device 10 runs out of power, moreover, the first conversion unit 107 has an independent energy-storage element 111-1, and the second conversion unit 109 has an independent energy-storage element 113-1. Therefore, when the network device 10 runs out of power, the energy of the single energy-storage element 111-1 or 113-1 would not be simultaneously consumed by both the first and the second conversion units 107 and 109. In other words, the energy of the energy-storage element 111-1 would only be consumed by the first conversion unit 107, and the energy of the energy-storage element 113-1 would only be consumed by the second conversion unit 109. In this case, the capacitances of the capacitors C1 and C2 can be significantly reduced.

Meanwhile, the SoC 103 and the line driver 105 would be continuously operated for a certain time in response to the energies of the respective energy-storage elements 111-1 and 113-1. Accordingly, the SoC 103 can effectively generate the dying gasp signal Dy_Ga to the line driver 105 even if the SoC 103 is in full loading. Also, the line driver 105 can effectively amplify the generated dying gasp signal Dy_Ga, and transmit the amplified dying gasp signal Dy_Ga to the CO 20. As a result, all of problems mentioned in the "Related Art" can be solved by the teachings of the present embodiment.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A network device, comprising:
    a communication port;
    a system-on-a-chip (SoC), operated under a first DC operation voltage and a second DC operation voltage, wherein the SoC is used for generating a dying gasp signal when the network device runs out of power;
    a line driver, coupled between the communication port and the SoC, and operated under the second DC operation voltage and a third DC operation voltage, wherein the line driver is used for receiving and amplifying the dying gasp signal from the SoC, and transmitting the amplified dying gasp signal to a central office (CO);
    a first conversion unit, coupled to the SoC and the line driver, for receiving and converting a DC input voltage, so as to generate the first DC operation voltage and the second DC operation voltage;
    a second conversion unit, coupled to the line driver, for receiving and converting the DC input voltage, so as to generate the third DC operation voltage;
    a first energy-storage unit, coupled to the first conversion unit, for providing a first DC power relating to the DC input voltage to the first conversion unit when the network device runs out of power; and
    a second energy-storage unit, coupled to the second conversion unit, for providing a second DC power relating to the DC input voltage to the second conversion unit when the network device runs out of power.

2. The network device according to claim 1, wherein the SoC comprises:
    a processing part, for being served as core of operation of the network device;
    a detection part, for detecting whether the network runs out of power or not; and
    a dying gasp signal generating part, for generating the dying gasp signal when the network device runs out of power.

3. The network device according to claim 1, wherein the first conversion unit comprises:
    a first DC-DC converter, for receiving and converting the DC input voltage, so as to generate the first DC operation voltage; and
    a second DC-DC converter, for receiving and converting the DC input voltage, so as to generate the second DC operation voltage.

4. The network device according to claim 1, wherein the second conversion unit comprises:
    a DC-DC converter, for receiving and converting the DC input voltage, so as to generate the third DC operation voltage.

5. The network device according to claim 1, wherein the first energy-storage unit comprises:
    an energy-storage element, for providing the first DC power to the first conversion unit when the network device runs out of power, otherwise, for being charged in response to the DC input voltage.

6. The network device according to claim 5, wherein the first energy-storage unit further comprises:
    a diode, having an anode coupled to the energy-storage element and a cathode coupled to the first conversion unit; and
    a resistor, coupled with the diode in parallel.

7. The network device according to claim 5, wherein the energy-storage element comprises at least a capacitor.

8. The network device according to claim 1, wherein the second energy-storage unit comprises:
    an energy-storage element, for providing the first DC power to the second conversion unit when the network device runs out of power, otherwise, for being charged in response to the DC input voltage.

9. The network device according to claim 8, wherein the second energy-storage unit further comprises:
    a diode, having an anode coupled to the energy-storage element and a cathode coupled to the second conversion unit; and
    a resistor, coupled with the diode in parallel.

10. The network device according to claim 8, wherein the energy-storage element comprises at least a capacitor.

11. The network device according to claim 1, further comprising:

a first diode, having an anode receiving the DC input voltage and a cathode coupled to the first conversion unit; and a second diode, having an anode receiving the DC input voltage and a cathode coupled to the second conversion unit.

12. The network device according to claim 9, further comprising:

a power conversion unit, for receiving and converting an AC power or a DC power, so as to provide the DC input voltage;

a third diode, having an anode receiving the DC input voltage provided by the power conversion unit;

a switching unit, coupled to a cathode of the third diode, for transmitting the DC input voltage to the anodes of the first and the second diodes until the network device runs out of power; and an over-voltage-protection (OVP) unit, coupled to the cathode of the third diode and the switching unit, for controlling the switching unit to stop transmitting the DC input voltage when the DC input voltage provided by the power conversion unit is over-voltage.

13. The network device according claim 1, wherein the network device is a customer's premises equipment (CPE) relating to a digital subscriber line (DSL).

14. The network device according claim 13, wherein the DSL comprises an asymmetrical DSL (ADSL) or a very high bit rate DSL (VDSL).

15. A network device, comprising:

a system-on-a-chip (Soc);

a line driver, coupled to the SoC; and at least two independent energy-storage elements, wherein when the network device runs out of power, the SoC generates a dying gasp signal to the line driver in response to energy of one of the energy-storage elements, and then the line driver amplifies and transmits the dying gasp signal to a Central Office (CO) in response to energy of the other of the energy-storage elements.

16. The network device according to claim 15, wherein the energy-storage elements are capacitors.

17. The network device according claim 15, wherein the network device is a customer's premises equipment (CPE) relating to a digital subscriber line (DSL).

18. The network device according claim 17, wherein the DSL comprises an asymmetrical DSL (ADSL) or a very high bit rate DSL (VDSL).

* * * * *